United States Patent
Tu et al.

(10) Patent No.: US 8,145,154 B2
(45) Date of Patent: Mar. 27, 2012

(54) APPROXIMATION METHOD FOR SIGNAL-TO-NOISE RATIO SOFT INFORMATION FOR A COMMUNICATIONS SYSTEM

(75) Inventors: Yung-Szu Tu, Taipei County (TW); Jiunn-Tsair Chen, Hsinchu County (TW); Chun-Hsien Wen, Hsinchu County (TW); Cheng-Hsuan Wu, Taipei (TW); Chien-Cheng Lin, Taichung County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 380 days.

(21) Appl. No.: 12/479,838

(22) Filed: Jun. 7, 2009

(65) Prior Publication Data

US 2010/0190457 A1 Jul. 29, 2010

(30) Foreign Application Priority Data

Jan. 23, 2009 (TW) ................................ 98102920 A

(51) Int. Cl.
*H03C 1/62* (2006.01)
*H04B 17/00* (2006.01)

(52) U.S. Cl. .................................. 455/115.1; 455/67.11
(58) Field of Classification Search ............... 455/67.11, 455/226.1, 226.3, 115.1, 67.13; 375/227; 702/69, 137
See application file for complete search history.

(56) References Cited

U.S. PATENT DOCUMENTS 7,639,735 B1 * 12/2009 Dick et al. .................... 375/227
2005/0008103 A1 * 1/2005 Sternberg et al. ............. 375/340

* cited by examiner

*Primary Examiner* — Nguyen Vo
(74) *Attorney, Agent, or Firm* — Winston Hsu; Scott Margo

(57) ABSTRACT

An approximation method for SNR soft information for a transmitter of a communications system includes obtaining a conditional probability density function (PDF) corresponding to a response message of a transmitted packet, obtaining a PDF of a probability distribution model, and a mean and a variance of the PDF, by approximating the conditional PDF corresponding to the response message with the probability distribution model, and calculating a second mean and a second variance of a second PDF approximated to a conditional PDF of SNR corresponding to the transmitted packet according to the mean and the variance of the PDF, and a first mean and a first variance of a first PDF approximated to a conditional PDF of SNR corresponding to another transmitted packet immediately preceding the transmitted packet.

8 Claims, 3 Drawing Sheets

APPROXIMATION METHOD FOR SIGNAL-TO-NOISE RATIO SOFT INFORMATION FOR A COMMUNICATIONS SYSTEM

BACKGROUND OF THE INVENTION

1. Field of the Invention

The present invention relates to an approximation method for signal-to-noise ratio soft information for a transmitter of a communications system, and more particularly, to an approximation method for approximating signal-to-noise ratio soft information with a probability distribution model.

2. Description of the Prior Art

To achieve expected communication functions and quality in a wireless communications system, different modulation and coding schemes (MCS), having different modulation techniques, coding rates, etc. for different data rates, are defined in associated specifications, with each different modulation and coding scheme distinguished by an index. For example, in a wireless communications system complying with IEEE 802.11n standard, MCS-15 represents a modulation and coding scheme using 64-QAM and a coding rate of 5/6, and relates to data rates of 20 MHz or 40 MHz according to the selected bandwidth. The communications system can select an appropriate MCS from current modulation and coding schemes, for achieving the expected throughput.

In the wireless communications system, a transmission channel is not ideal, and transmission failure occurs due to many factors, such as multipath transmission, noise, and interference caused by electronic equipment. When the environment of the transmission channel changes, a transmitter of the wireless communications system may have to reselect the modulation and coding scheme for a higher data rate when the channel condition is good, or for a lower data rate when the channel condition is getting worse, so that the throughput of the wireless communications system can be maintained at an acceptable level.

When the transmitter has no idea about the channel condition, the transmitter can only estimate the channel condition through transmission results of transmitted packets, i.e. positive acknowledgements (ACKs) or negative acknowledgements (NACKs), transmitted by a receiver of the communications system. In order to determine the channel condition, several methods are adapted, including an Auto Rate Fallback (ARF) algorithm, an adaptive ARF (AARF) algorithm, a sample rate algorithm, an Onoe algorithm, an adaptive Multi Rate Retry (AMRR) algorithm, a Multiband Atheros Driver for WiFi (Madwifi) algorithm, and a Robust Rate Adaptation algorithm (RRAA). The ARF and AARF algorithms use probe packets to determine whether a data rate higher than the current one can be achieved, and decreases the data rate when consecutive transmission failures occur. The sample rate algorithm periodically transmits probe packets with randomly-selected modulation and coding schemes, and uses the modulation and coding scheme that achieves the highest throughput for transmitting normal data packets. The Onoe algorithm uses a specific data rate to transmit packets for a period of time, and increases the data rate to a higher level when the packet error rate in the period is lower than 10%. The AMRR and Madwifi algorithms use probe packets and two packet correct rate thresholds to determine whether to step up or step down the data rate. The RRAA algorithm determines the data rate according to the received ACK and the packet correct rate.

In summary, in most conventional rate adaptation methods, the method determines whether to update the data rate by transmitting additional probe packets or by estimating the transmission quality for a period of time. For the application service of real time communications, the above rate adaptation methods take a great deal of time to update the data rate and cannot improve the throughput efficiently. Therefore, in Taiwan patent application No. 97146118, the Applicant discloses a rate adaptation method in which a transmitter of the wireless communications system updates a conditional probability density function (PDF) of signal-to-noise ratio (SNR) according to a conditional PDF of receiving a response message of a latest transmitted packet and a conditional PDF of SNR corresponding to a packet immediately preceding the latest transmitted packet, and the transmitter reselects a proper modulation and coding scheme for a next packet to be transmitted. Note that the conditional PDF of SNR is called SNR soft information.

Note that the conditional PDF of SNR mentioned in Taiwan patent application No. 97146118 is the conditional PDF of SNR given received signal strength indication (RSSI) values and the ACK/NACK of all transmitted packets with various modulation and coding schemes, denoted by p(SNR|RSSI, MCSs, ACKs/NACKs). The conditional PDF of SNR is updated every time an ACK or a NACK is received. The conditional PDF of SNR is given by:

$$p(SNR \mid RSSI, MCSs, ACKs/NACKs) = \qquad (1)$$

$$p(SNR \mid RSSI) \prod_{i=0}^{N} \frac{p(ACKi/NACKi \mid SNR, MCSi)}{p(ACKi/NACKi \mid MCSi)},$$

where N is the number of accumulated transmitted packets, $MCS_i$ is the modulation and coding scheme used for an $i^{th}$ transmitted packet, and $ACK_i/NACK_i$ indicates a response message, which can be an ACK or a NACK, of the $i^{th}$ transmitted packet. Note that the transmitter not receiving an ACK in time is also regarded as receiving a NACK. p(SNR|RSSI) is the conditional PDF of SNR given various RSSI values before any ACK/NACK is received. $p(ACK_i/NACK_i|MCS_i)$ is the probability of receiving an ACK/NACK of the $i^{th}$ transmitted packet given the modulation and coding scheme $MCS_i$. $p(ACK_i/NACK_i|SNR, MCS_i)$ is a conditional PDF of receiving an ACK/NACK of the $i^{th}$ transmitted packet given $MCS_i$ with various SNRs. The equation (1) can be further represented as:

$$p(SNR \mid RSSI, MCSs, ACKs/NACKs)_N = \qquad (2)$$
$$p(SNR \mid RSSI, MCSs, ACKs/NACKs)_{N-1} \times$$
$$\frac{p(ACK_N \mid SNR, MCS_N)}{p(ACK_N \mid MCS_N)},$$

and $p(SNR \mid RSSI, MCSs, ACKs, NACKs)_N$ $$p(SNR \mid RSSI, MCSs, ACKs/NACKs)_{N-1} \times \qquad (3)$$
$$\frac{1 - p(ACK_N \mid SNR, MCS_N)}{1 - p(ACK_N \mid MCS_N)}.$$

The equation (2) shows the conditional PDF of SNR when the response message is an ACK, and the equation (3) shows the conditional PDF of SNR when the response message is a NACK. In other words, when the transmitter receives the response message of the $N^{th}$ packet, the transmitter obtains the conditional PDF of SNR corresponding to the $N^{th}$ packet, $p(SNR|RSSI, MCSs, ACKs/NACKs)_N$, according to the conditional PDF of SNR corresponding to an $(N-1)^{th}$ packet, p(SNR|RSSI, MCSs, ACKs/NACKs)$_{N-1}$, and the conditional PDF of receiving the response message of the $N^{th}$ packet with various SNRs, p(ACK$_N$|SNR, MCS$_N$) or 1−p(ACK$_N$|SNR, MCS$_N$).

In addition, after the conditional PDF of SNR corresponding to the $(N-1)^{th}$ packet is obtained, the transmitter selects a modulation and coding scheme MCS$_N$ for the $N^{th}$ packet according to the conditional PDF of SNR corresponding to the $(N-1)^{th}$ packet. Next, after the response message of the $(N+1)^{th}$ packet is received, the transmitter obtains a conditional PDF of SNR corresponding to the $N^{th}$ packet and selects a modulation and coding scheme MCS$_{N+1}$ for the $(N+1)^{th}$ packet accordingly. Note that selection of the modulation and coding scheme is disclosed in Taiwan patent application No. 97146118 and detailed description thereof is not given here. Briefly, the modulation and coding scheme is reselected every time a response message is received in the rate adaptation method disclosed in Taiwan patent application No. 97146118. Therefore, the transmitter can find the optimized data rate with an acceptable throughput as soon as possible.

From the above equations (1), (2) and (3), the transmitter performs the multiplication of p(SNR|RSSI, MCSs, ACKs/NACKs)$_{N-1}$ and p(ACK$_N$|SNR, MCS$_N$) for updating the conditional PDF of SNR. In other words, the transmitter has to perform the multiplication for each SNR value. Please refer to FIG. 1, which is a diagram of the conditional PDF of receiving an ACK given the modulation and coding scheme versus various SNRs for a conventional transmitter of a wireless communications system complying with IEEE 802.11n standard. As in FIG. 1, the range of SNR is from 0 dB to 30 dB. If the sampling interval of SNR is 0.1 dB, for example, the transmitter has to perform hundreds of multiplications of conditional PDFs to obtain the conditional PDF of SNR. In this situation, the operation complexity is quite high, and the efficiency of the transmitter is reduced.

SUMMARY OF THE INVENTION

It is therefore a primary objective of the claimed invention to provide an approximation method for SNR soft information for a transmitter of a communications system.

The present invention discloses an approximation method for SNR soft information for a transmitter of a communications system. The approximation method includes obtaining a conditional PDF corresponding to a response message of a transmitted packet, obtaining a PDF of a probability distribution model, and a mean and a variance of the PDF, by approximating the conditional PDF corresponding to the response message with the probability distribution model, and calculating a second mean and a second variance of a second PDF approximated to a conditional PDF of SNR corresponding to the transmitted packet according to the mean and the variance of the PDF, and a first mean and a first variance of a first PDF approximated to a conditional PDF of SNR corresponding to another transmitted packet immediately preceding the transmitted packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
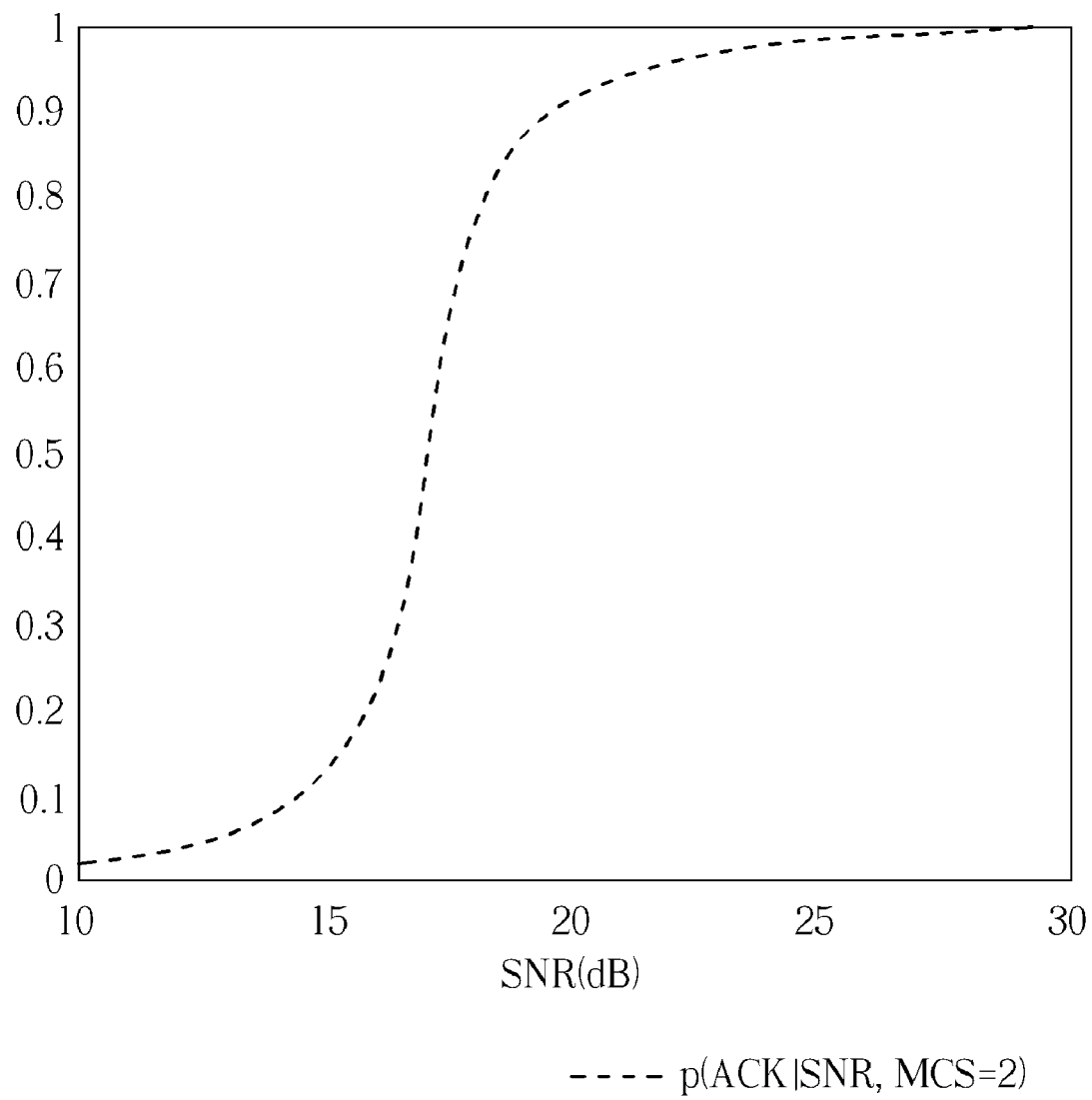
FIG. 1 is a diagram of a probability density function of receiving an ACK given a modulation and coding scheme versus various SNR for a conventional transmitter of a wireless communications system complying with IEEE 802.11n standard.
Figure 2:
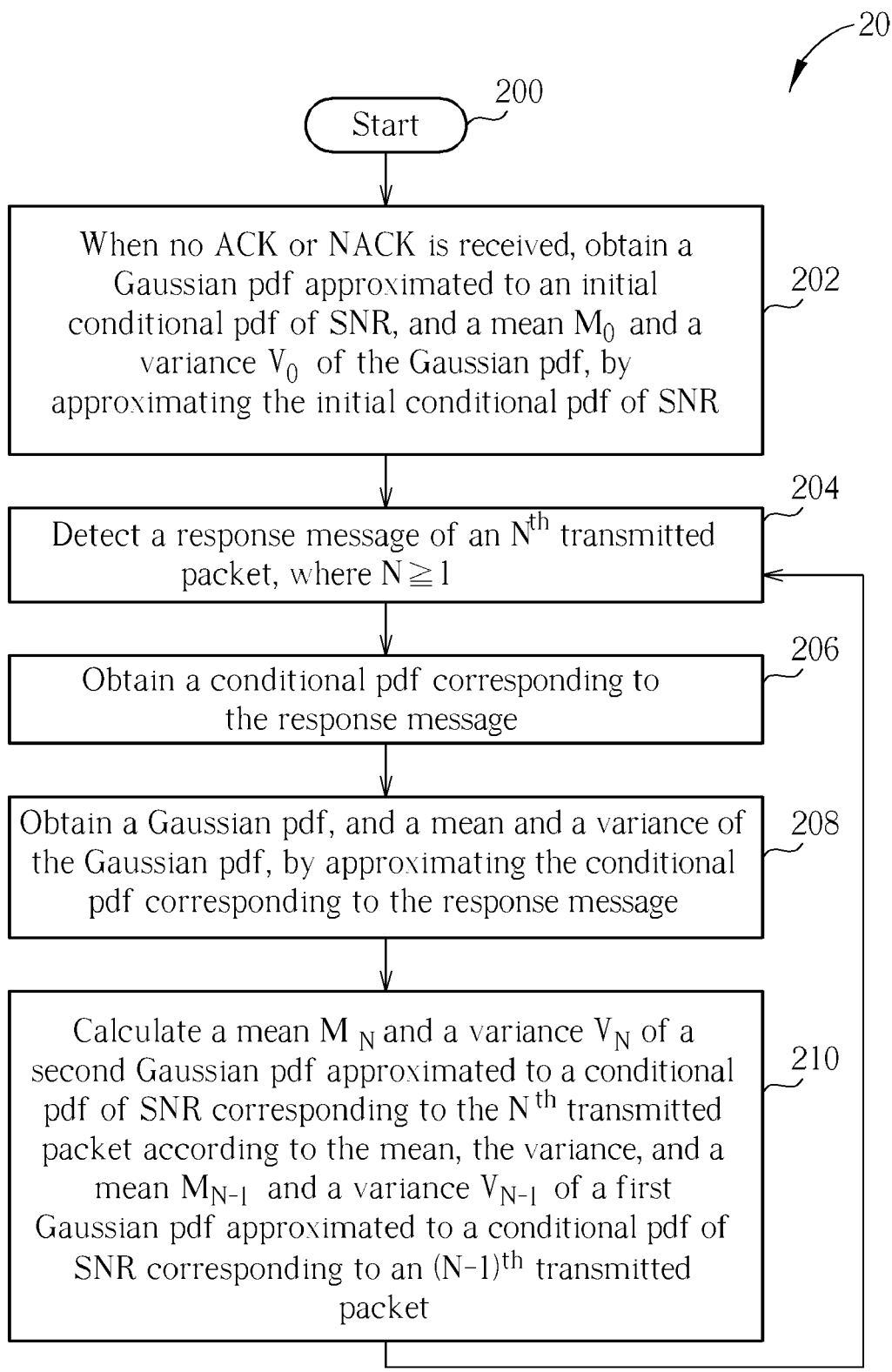
FIG. 2 is a flowchart of a process according to an embodiment of the present invention.

Please refer to FIG. 2, which is a flowchart of a process 20 according to an embodiment of the present invention. The process 20 is utilized in the transmitter of a wireless communications system for improving the rate adaptation method disclosed in Taiwan patent application No. 97146118 to reduce operation complexity when obtaining a conditional probability density function (PDF) of signal-to-noise ratio (SNR). The process 20 comprises the following steps:

Step 200: Start.

Step 202: When no positive acknowledgement (ACK) or negative acknowledgement (NACK) is received, obtain a Gaussian PDF approximated to an initial conditional PDF of SNR, and a mean $M_0$ and a variance $V_0$ of the Gaussian PDF, by approximating the initial conditional PDF of SNR.

Step 204: Detect a response message of an $N^{th}$ transmitted packet, where $N \geq 1$.

Step 206: Obtain a conditional PDF corresponding to the response message.

Step 208: Obtain a Gaussian PDF, and a mean and a variance of the Gaussian PDF, by approximating the conditional PDF corresponding to the response message.

Step 210: Calculate a mean $M_N$ and a variance $V_N$ of a second Gaussian PDF approximated to a conditional PDF of SNR corresponding to the $N^{th}$ transmitted packet according to the mean, the variance, and a mean $M_{N-1}$ and a variance $V_{N-1}$ of a first Gaussian PDF approximated to a conditional PDF of SNR corresponding to an $(N-1)^{th}$ transmitted packet, and return to Step 204.

The equation (1) of the conditional PDF of SNR is given by:

$$p(SNR \mid RSSI, MCSs, ACKs/NACKs) = p(SNR \mid RSSI) \prod_{i=0}^{N} \frac{p(ACKi/NACKi \mid SNR, MCSi)}{p(ACKi/NACKi \mid MCSi)}.$$

p(SNR|RSSI), p(ACK$_i$/NACK$_i$|MCS), and p(ACK$_i$/NACK$_i$|SNR, MCS) are described previously and are not repeated herein. Note that, p(SNR|RSSI) shown in the equation (1) is a conditional PDF of SNR given various received signal strength indication (RSSI) values before any ACK or NACK is received, and is defined as the initial conditional PDF of SNR mentioned in Step 202. When the transmitter starts to transmit data packets, the transmitter also receives response messages, i.e. ACKs or NACKs, from a receiver, for informing the transmitter that the data packets are successfully received or not. p(ACK$_i$/NACK$_i$|SNR, MCS) is a conditional PDF of receiving an ACK or a NACK of the $i^{th}$ transmitted packet given a modulation and coding scheme MCS$_i$, and is called "the conditional PDF of receiving the response message" for short.

Initially, when the transmitter has not yet received any response messages, p(SNR|RSSI, MCSs, ACKs) is equal to p(SNR|RSSI). According to Step 202, the transmitter uses a Gaussian distribution to approximate p(SNR|RSSI) to obtain a Gaussian PDF approximated to p(SNR|RSSI), and obtains a mean $M_0$ and a variance $V_0$ of the Gaussian PDF approximated to p(SNR|RSSI). With the Gaussian distribution, the result of the multiplication of Gaussian PDFs is also a Gaussian PDF, and a mean and a variance of the result of that multiplication can be calculated according to the means and the variance of original Gaussian PDFs. Additionally, when a mean and a variance are known, a related Gaussian PDF can be obtained accordingly.

Step 204 to Step 210 are performed every time the transmitter receives a response message. When the transmitter receives a response message corresponding to the $N^{th}$ transmitted packet, the transmitter detects whether the response message is an ACK or a NACK. When the response message is an ACK, according to Step 206, the transmitter obtains the conditional PDF of receiving the ACK, p($ACK_N$|SNR, $MCS_N$); when the response message is a NACK, or an ACK which is not received in time, the transmitter obtains the conditional PDF of receiving the NACK, 1−p($ACK_N$|SNR, $MCS_N$). According to Step 208, the transmitter uses the Gaussian distribution to approximate the conditional PDF of receiving the response message, p($ACK_N/NACK_N$|SNR, $MCS_N$), for obtaining a Gaussian PDF approximated to the conditional PDF of receiving the response message, and a mean and a variance of the Gaussian PDF. In the following equations, the mean is represented by mean($MCS_N$, ACK/NACK) and the variance is represented by var($MCS_N$, ACK/NACK).

Step 210 can be understood according to the equations (1), (2), (3), and the characteristics of Gaussian distribution. According to Step 210, the transmitter calculates a mean $M_N$ and a variance $V_N$ of a Gaussian PDF approximated to a conditional PDF of SNR corresponding to the $N^{th}$ transmitted packet, p(SNR|RSSI, ACKs, MCSs)$_N$, according to mean($MCS_N$, ACK/NACK), var($MCS_N$, ACK/NACK), a mean $M_{N-1}$ and a variance $V_{N-1}$ of a Gaussian PDF approximated to a conditional PDF of SNR corresponding to the $(N-1)^{th}$ transmitted packet, p(SNR|RSSI, ACKs, MCSs)$_{N-1}$. The mean $M_N$ and the variance $V_N$ are given by:

$$M_N = \frac{M_{N-1} \times \text{var}(MCS_N, ACK/NACK) + V_{N-1} \times \text{mean}(MCS_N, ACK/NACK)}{\text{var}(MCS_N, ACK/NACK) + V_{N-1}}, \text{ and} \quad (4)$$

$$V_N = \frac{V_{N-1} \times \text{var}(MCS_N, ACK/NACK)}{\text{var}(MCS_N, ACK/NACK) + V_{N-1}}. \quad (5)$$

After the mean $M_N$ and the variance $V_N$ are calculated, the transmitter returns to perform Step 204 and detects a next response message of a next transmitted packet. Taking the first packet transmission as an example, N is 1 and $MCS_1$ is the modulation and coding scheme used for transmitting the first packet. When the transmitter receives a response message corresponding to the first packet, the transmitter detects whether the response message is an ACK or a NACK, and obtains a conditional PDF of receiving the response message, p($ACK_1/NACK_1$|SNR, $MCS_1$), which is p($ACK_1$|SNR, $MCS_1$) or 1−p($ACK_1$|SNR, $MCS_1$). Then, the transmitter uses the Gaussian distribution to approximate p($ACK_1/NACK_1$|SNR, $MCS_1$) to obtain mean($MCS_1$, ACK/NACK) and var($MCS_1$, ACK/NACK) of a Gaussian PDF approximating the conditional PDF of receiving the response message, p($ACK_1/NACK_1$|SNR, $MCS_1$). Finally, according to Step 210, the transmitter calculates a mean $M_1$ and a variance $V_1$ of a Gaussian PDF approximated to the conditional PDF of SNR corresponding to the first transmitted packet. The mean $M_1$ and the variance $V_1$ are given by:

$$M_1 = \frac{M_0 \times \text{var}(MCS_1, ACK/NACK) + V_0 \times \text{mean}(MCS_1, ACK/NACK)}{\text{var}(MCS_1, ACK/NACK) + V_0}, \text{ and} \quad (6)$$

$$V_1 = \frac{V_0 \times \text{var}(MCS_1, ACK/NACK)}{\text{var}(MCS_1, ACK/NACK) + V_0}. \quad (7)$$

Similarly, when the transmitter receives a response message corresponding to the second transmitted packet, the transmitter detects the response message and calculates a mean $M_2$ and a variance $V_2$ of a Gaussian PDF approximated to a conditional PDF of SNR corresponding to the second transmitted packet, and so forth.

Figure 3:
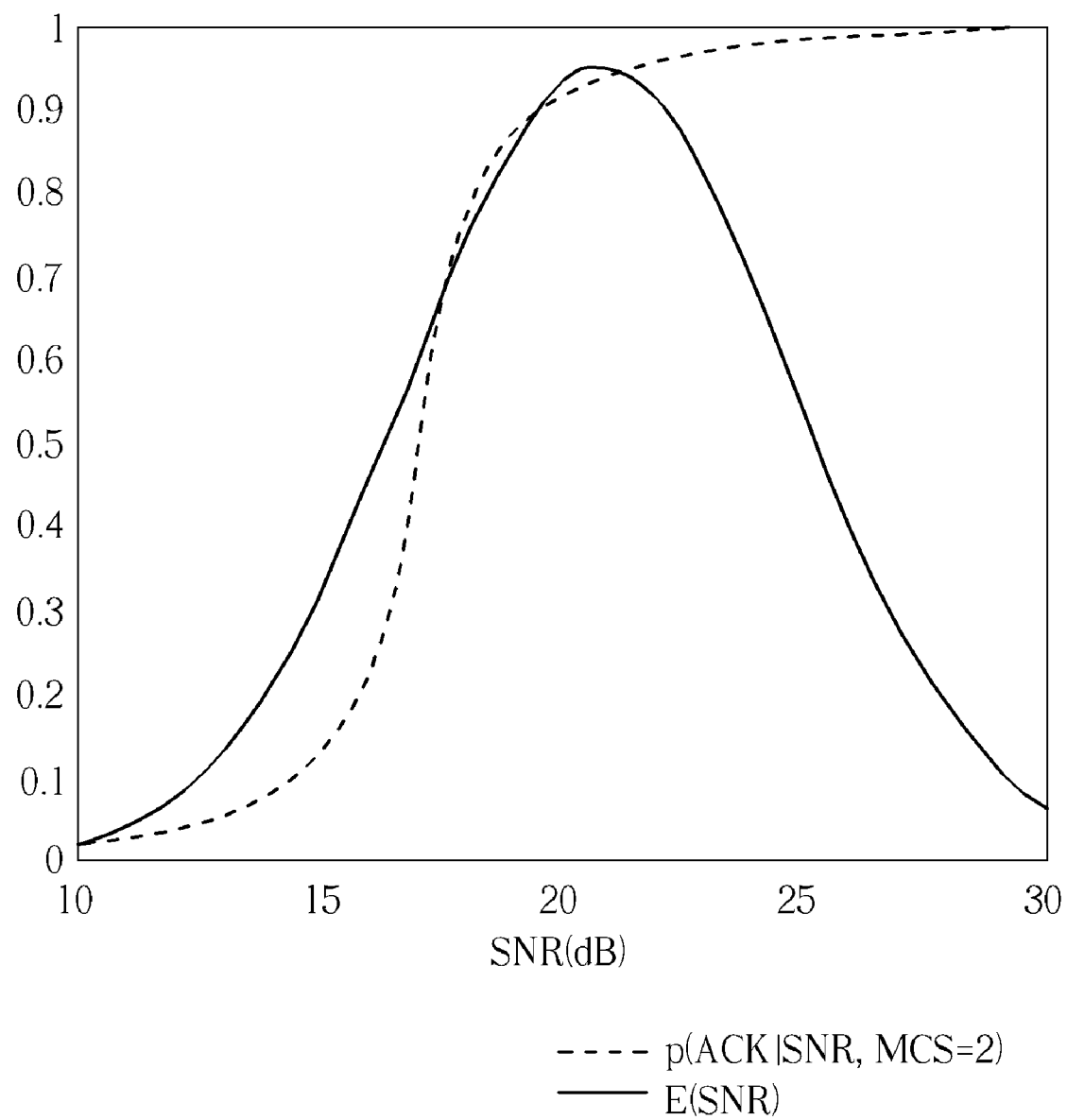
FIG. 3 is a diagram of a Gaussian probability density function of receiving an ACK given a modulation and coding scheme versus various SNR according to the process in FIG. 2.

Please refer to FIG. 3, which is a diagram of a Gaussian PDF, E (SNR), approximated to the conditional PDF of receiving an ACK given a modulation and coding scheme, p(ACK|SNR, MCS=2), versus various SNRs according to the process 20. As shown in FIG. 3, the overall curve of p(ACK|SNR, MCS=2) is not similar to a Gaussian distribution. However, for the acceptable range of p(ACK|SNR, MCS=2)=0.6−0.95, p(ACK|SNR, MCS=2) approximates the Gaussian PDF E(SNR). Therefore, the Gaussian distribution can be used for the approximation of the conditional PDF of receiving the response message.

According to the above embodiment, the transmitter uses the Gaussian distribution to approximate the conditional PDF of receiving the response message of a transmitted packet, and obtains a Gaussian PDF approximated to the conditional PDF so as to calculate a mean and a variance of the Gaussian PDF. As a result, the multiplication of conditional PDFs is replaced by the multiplication of means and variances of Gaussian PDFs. Please note that, using the Gaussian distribution to approximate the conditional PDF of receiving the response message is only one embodiment of the present invention. In another embodiment, the transmitter can user another type of probability distribution model to perform the approximation.

In Taiwan patent application No. 97146118, the transmitter has to perform the multiplication of conditional PDFs with respect to each SNR value to obtain the conditional PDF of SNR, so as to reselect a proper modulation and coding scheme. In this situation, the operation complexity is quite high. In comparison, the transmitter only needs to calculate the mean and the variance of the Gaussian PDF approximated to the conditional PDF of receiving the response message, and thus can obtain the mean and the variance of a Gaussian PDF approximated to the conditional PDF of SNR. Furthermore, the transmitter obtains the Gaussian PDF approximated to the conditional PDF of SNR according to that mean and that variance, and selects a proper modulation and coding scheme for a next transmitted packet according to the obtained Gaussian PDF. Through the present invention, the transmitter does not require performing multiplication of conditional PDFs by each SNR value, and the complexity is highly improved. The method for reselecting the modulation and coding scheme is disclosed in Taiwan patent application No. 97146118, and is not given herein.

In conclusion, the present invention uses a probability distribution model to approximate the conditional PDF of receiving the response message each time the transmitter receives the response message, and replaces the multiplication of conditional PDFs with the multiplication of means and variances of the PDF with the proper probability distribution model. Therefore, the operation complexity when the transmitter updates the conditional PDF of SNR is greatly reduced.

Those skilled in the art will readily observe that numerous modifications and alterations of the device and method may be made while retaining the teachings of the invention.

What is claimed is:

1. An approximation method for signal-to-noise ratio (SNR) soft information for a transmitter of a communications system, the approximation method comprising:
    obtaining a conditional probability density function (PDF) corresponding to a response message;
    obtaining a PDF of a probability distribution model, and a mean and a variance of the PDF, by approximating the conditional PDF corresponding to the response message with the probability distribution model;
    calculating a second mean and a second variance of a second PDF approximated to a conditional PDF of SNR corresponding to the transmitted packet according to the mean and the variance of the PDF, and a first mean and a first variance of a first PDF approximated to a conditional PDF of SNR corresponding to another transmitted packet immediately preceding the transmitted packet; and
    transmitting a packet according to the second mean and the second variance.

2. The approximation method of claim 1 further comprising approximating an initial conditional PDF of SNR with the probability distribution model before the step of obtaining the conditional PDF corresponding to the response message, wherein the initial conditional PDF of SNR is a conditional PDF of SNR given various received signal strength indication (RSSI) values.

3. The approximation method of claim 1, wherein the probability distribution model is a Gaussian distribution, and the PDF obtained by approximating the conditional PDF corresponding to the response message, the first PDF, and the second PDF are Gaussian PDFs.

4. The approximation method of claim 1, wherein the second mean is denoted as $M_N$ and is given by:

$$M_N = \frac{M_{N-1} \times \text{var}(MCS_N, ACK/NACK) + V_{N-1} \times \text{mean}(MCS_N, ACK/NACK)}{\text{var}(MCS_N, ACK/NACK) + V_{N-1}},$$

where N is an order of the transmitted packet, (N−1) is an order of the another transmitted packet immediately preceding the transmitted packet, $MCS_N$ is a modulation and coding scheme used for the transmitted packet, ACK/NACK indicates the response message of the transmitted packet, mean($MCS_N$, ACK/NACK) is the mean, var($MCS_N$, ACK/NACK) is the variance, $M_{N-1}$ is the first mean, and $V_{N-1}$ is the first variance.

5. The approximation method of claim 1, wherein the second variance is denoted as $V_N$ and is given by:

$$V_N = \frac{V_{N-1} \times \text{var}(MCS_N, ACK/NACK)}{\text{var}(MCS_N, ACK/NACK) + V_{N-1}},$$

where N is an order of the transmitted packet, (N−1) is an order of the another transmitted packet immediately preceding the transmitted packet, $MCS_N$ is a modulation and coding scheme used for the transmitted packet, ACK/NACK indicates the response message of the transmitted packet, var($MCS_N$, ACK/NACK) is the variance, and $V_{N-1}$ is the first variance.

6. The approximation method of claim 1, where the response message is a positive acknowledgement (ACK) or a negative acknowledgement (NACK).

7. The approximation method of claim 1, wherein the conditional PDF corresponding to the response message is a conditional PDF of the transmitter receiving the response message given a modulation and coding scheme with various SNRs.

8. The approximation method of claim 1, wherein the response message corresponds to the transmitted packet.

* * * * *